United States Patent [19]

Callis et al.

[11] 4,031,398
[45] June 21, 1977

[54] VIDEO FLUOROMETER

[75] Inventors: James B. Callis; Ernest R. Davidson, both of Seattle, Wash.

[73] Assignee: Research Corporation, New York, N.Y.

[22] Filed: Mar. 23, 1976

[21] Appl. No.: 669,493

[52] U.S. Cl. .............................. 250/458; 250/328; 250/365; 250/461 R

[51] Int. Cl.² ...................... F21K 2/02; G01T 1/00

[58] Field of Search .......... 250/458, 304, 365, 460, 250/461, 328

[56] References Cited

UNITED STATES PATENTS

| | | | |
|---|---|---|---|
| 3,449,571 | 6/1969 | Hoerman et al. | 250/304 |
| 3,814,939 | 6/1974 | Parker et al. | 250/304 |
| 3,886,363 | 5/1975 | Ohnishi | 250/365 |
| 3,916,197 | 10/1975 | Fulwyler | 250/304 |
| 3,936,190 | 2/1976 | Ohnishi et al. | 250/458 |

Primary Examiner—Harold A. Dixon

Attorney, Agent, or Firm—Cooper, Dunham, Clark, Griffin & Moran

[57] ABSTRACT

A fluoroescence spectrometer or fluorometer for simultaneously presenting the excitation and emission spectra of a multicomponent sample in the form of an intensity matrix is disclosed which comprises an elongated cuvette for holding the fluoroescent sample, along whose length a spatially distributed spectrum of exciting energies is simultaneously directed, and a polychromatic analyzer which simultaneously analyzes the excitation and emission spectra given off by the sample along its length by producing a spectrally dispersed image of the cuvette. The matrix of spectral intensities so obtained may be converted to electrical signals by a low-light-level television detector and displayed on a video monitor or processed with appropriate analog or digital computers for immediate analysis. The instrument can acquire 241 emission spectra taken at 241 different exciting wavelengths in 16.7 milliseconds.

19 Claims, 14 Drawing Figures

CUVETTE IMAGE

DISPERSED IMAGE

VIDEO FLUOROMETER

BACKGROUND OF THE INVENTION

The present invention relates to the field of fluorescence analysis and more particularly to an instrument and method for automatically and simultaneously analyzing the excitation and emission spectra of a multicomponent fluorescent sample.

Fluorescence, the emission of electromagnetic radiation in the visible and ultraviolet regions of the spectrum upon the absorption of light of shorter wavelengths, is a useful analytical property of many chemical compounds and biological samples, so that the fluorescence assay has become a universally accepted method for the analysis of a wide variety of substances of interest to chemists, biologists and clinicians. The principal advantages of fluorescence assays are their sensitivity, rapidity and relatively low cost per analysis. The problems or limitations of fluorescence analysis include interference from "blank" fluorescence, Rayleigh and Raman scattering, and an inability to conveniently analyze for several substances simultaneously. Five parameters are available for the characterization of luminescent materials, that is, emission spectrum, excitation spectrum, quantum yield, lifetime and polarization of the emission. While instrumentation exists to obtain all five parameters of luminescence, the acquisition of the data is extremely time-consuming and requires highly trained personnel for both data acquisition and interpretation. As a consequence, in a routine analysis, only a single measurement is generally made, that is, the fluorescence intensity of a sample at a fixed pair of wavelengths of excitation and emission. Present fluorescence spectrophotometers for performing this measurement essentially comprise two monochromaators functioning independently of each other and having two light sources. The output of the first source, generally a Xenon Arc Lamp, passes into the first monochromator (called an excitation monochromator in that it disperses the light) and provides monochromatic light to excite the sample. The excited sample becomes the source for the second monochromator which is called the emission or analyzing monochromator. The collecting optics for the emission monochromator are arranged to detect fluorescence from the sample at an angle other than 180° relative to the exciting light. The angle is usually at 90° or 45° since such an arrangement provides the best rejection of exciting light, and makes it possible to achieve high sensitivity, selectivity and ease of sampling.

In operation, this fluorescence spectrometer can provide either the excitation spectra or emission spectra from a fluorescent sample. Firstly, by adjusting the excitation monochromator to an appropriate excitation wavelength for a given sample and causing the emission monochromator to scan, the emission spectrum of the sample will be presented at the output. Conversely, the emission monochromator can be set to an emission wavelength of the sample and the excitation monochromator may be scanned to produce the excitation spectrum of a sample. Commercially available spectrofluorometers of this type are the Perkin-Elmer MPF-2A, the Aminco-Bowman, the Turner 210, and the Farrand MK-1. All of these instruments use grating monochromators to select the bandwidths of light for excitation and emission. Scanning is accomplished by mechanically displacing the gratings causing the dispersed spectrum to be swept past the monochromator exit slit. The light intensity of each position of the grating is monitored by means of a photomultiplier tube. However, because of the delicate mechanical linkage between the scanning motors and the gratings and the small number of photons emitted, a spectral scan generally takes on the order of 1 to 5 minutes. Thus to obtain 50 fluorescent scans at 50 exciting wavelengths or 50 excitation scans at 50 fluorescent wavelengths could take over 4 hours, a period of time making extraordinary demands on the stability of the instrument if several samples are to be compared.

In contrast, the present invention provides an analytical instrument which can simultaneously measure, in real time, all emission and excitation spectra of a luminescent sample within a given wavelength range and, under favorable conditions, this data can be acquired in the same time as a single measurement of fluorescence intensity in a conventional fluorescence spectrometer. In addition, with a real time dedicated data processor the data may be displayed in a graphical format which is immediately comprehensible to an operator so that a convergence to useful results can be obtained with a minimal waste of computer time. Furthermore, it is possible to record the lifetimes of the emitting species, where the lifetime may be in the range of several hundred picoseconds to tens of seconds, with appropriate exciting sources. In the case of the analysis of multicomponent samples it is possible to obtain (a) the number of emitting species in the sample; (b) the amounts of each species if the spectra of each is known; and (c) a range of possible spectra of the individual components contributing to the total fluorescence, if the spectra are unknown.

SUMMARY OF THE INVENTION

The present invention embodies a fluorometer incorporating an elongated cuvette for holding the fluorescent sample and along whose length a spatially distributed polychromatic excitation beam is focussed so that a multicomponent sample will show a spatial variation in its fluorescence. This geometry is shown in detail in FIG. 1. Accordingly, a sample component which absorbs light most strongly in the red region of the spectrum will fluoresce most strongly in the region along the length of the cuvette at which the red beam is focussed, while substances which absorb most strongly in the blue will fluoresce more strongly in the region along the length of the cuvette at which the blue beam is focussed. The spatial variation in fluorescence may then be analyzed using a modified emission monochromator on whose entrance slit an image of the cuvette is focussed, and whose exit slit plane is replaced by a wide aperture. The monochromator is mounted so that the long axis of the entrance slit and the long axis of the cuvette image coincide. Since the monochromator preserves spatial information along the slit axis, the image present at the exit slit plane is a record of the fluorescence spectra from each position along the long axis of the cuvette. Thus, information about excitation spectra are produced simultaneously with information about emission spectra in the form of an image at the exit slit plane which may be called the "fluorescence intensity matrix". The fluorescence intensity matrix so produced may then be detected with a television camera for instantaneous analysis, processing and display.

DETAILED DESCRIPTION OF THE INVENTION

Figure 1:
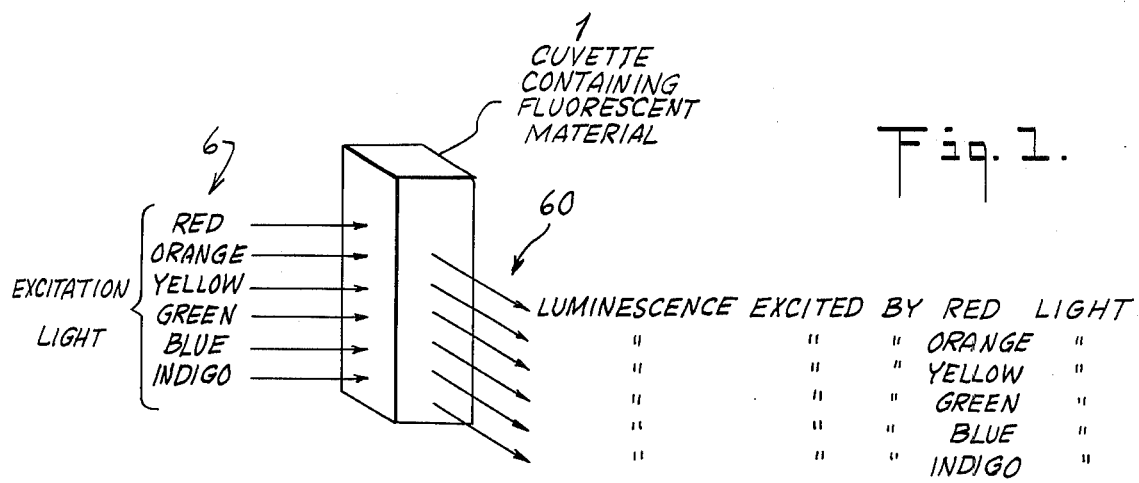
FIG. 1 is a perspective view of an elongated sample cuvette in accordance with the present invention, illustrating the manner of illumination and fluorescence in detail.

In FIG. 1 an elongated sample cuvette 1 is shown containing a fluorescent sample. The sample is illuminated by a polychromatic excitation beam 6 which is spatially distributed along its length. As a result of excitation in this manner, a multicomponent sample in the cuvette will show a spatial variation in its fluorescence, such that substances which absorb light most strongly in the red region of the spectrum will fluoresce most strongly near the top of the cuvette 1 while substances which absorb most strongly in the blue region will fluoresce most strongly near the bottom of the cuvette. This spatially-distributed fluorescence, and particularly the resulting set of fluorescence emissions 60 emerging from the cuvette 1 in a direction at right angles to that of the excitation beam 6, may be selected for analysis. Using such a sample cuvette arrangement the present invention involves the production of the excitation beam by a suitable polychromator and the analysis of the resulting spatially-distributed set of fluorescence emissions by a suitable polychromator, and the combination of these polychromators and the elongated cuvette with a suitable spectra detecting means to form a fluorometer which is capable of simultaneously displaying the excitation and emission spectra of all the components of the sample in the cuvette.

Figure 4:
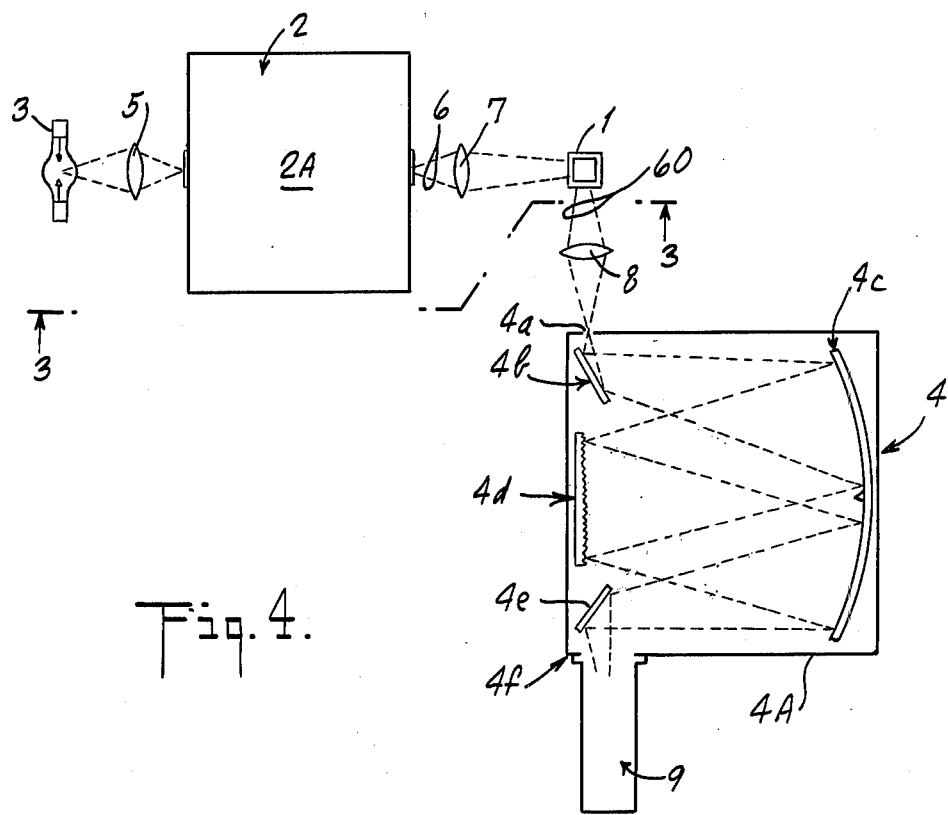
FIG. 4 is a plan view of a schematic diagram of both optical portions of a fluorometer in accordance with the present invention and illustrating the optical path through the analyzing or emission polychromator.

A schematic optical diagram of such a fluorometer in accordance with the present invention is shown in FIG. 4. The basic components comprise: an excitation polychromator 2 having a light source, such as a Xenon arc lamp 3; an elongated sample cuvette 1, disposed with respect to the excitation polychromator 2 such that the output spectrum 6 of exciting energies from the polychromator 2 are spatially distributed along the length of the cuvette 1 in the manner shown in detail in FIG. 1; an analyzing polychromator 4 disposed for receiving the spatially distributed fluorescence emissions from the cuvette 1; and a spectra detecting means 9 disposed at the exit of the analyzing polychromator 4 for sensing the dispersed image output thereof.

Figure 2B:
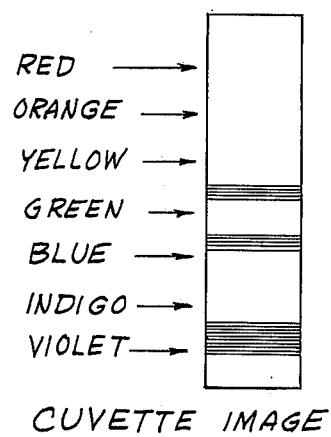
FIG. 2b is an illustration of the image of the set of fluorescence emissions emanating from an elongated cuvette containing a sample of the hypothetical compound whose spectra are plotted in FIG. 2(a).
Figure 2A:
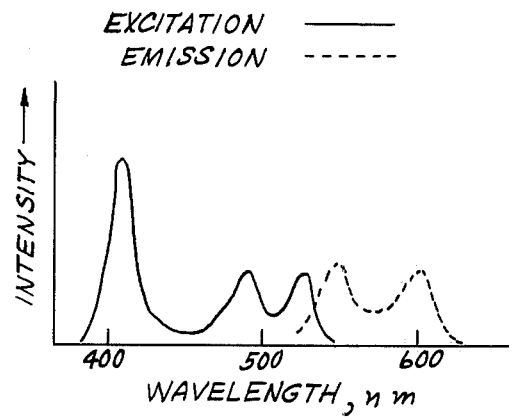
FIG. 2a represents a plot of the fluorescence excitation and fluorescence emission spectra of an hypothetical compound.
Figure 2C:
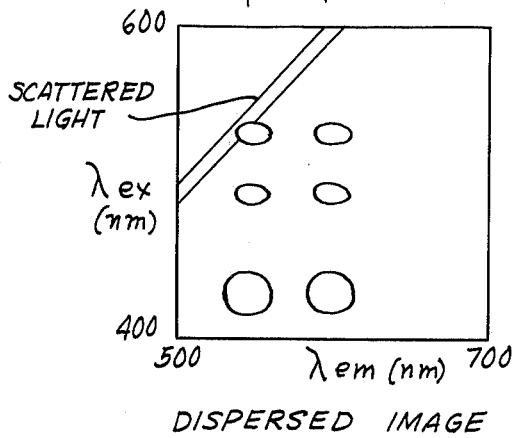
FIG. 2c illustrates the dispersed image or "fluorescence intensity matrix" produced by the emission polychromator as a result of its analysis of the set of fluorescence emissions emanating from the sample cuvette shown in FIG. 2b.
Figure 2D:
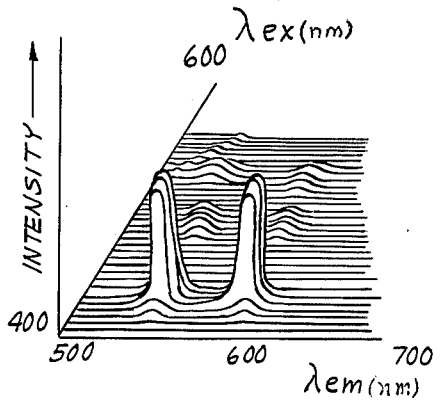
FIG. 2d is a three-dimensional display of the "fluorescence intensity matrix" shown in FIG. 2c.

Reference to FIGS. 2a–d will provide a basic indication of the images obtainable with the present fluorometer. FIG. 2a firstly represents a plot of the excitation and emission spectra of an hypothetical compound. FIG. 2b is an illustration of the image of the set of fluorescence emissions emanating from an elongated cuvette 1 containing a sample of the hypothetical compound of FIG. 2a upon excitation in the manner shown in FIG. 1. FIG. 2c illustrates the dispersed image or "fluorescence intensity matrix" produced by the analyzing polychromator 4 as a result of its analysis of the fluorescence emissions shown in FIG. 2b. And FIG. 2d illustrates a three-dimensional graphics display obtainable from the "fluorescence intensity matrix" shown in FIG. 2c upon processing of the output of detecting means 9.

Figure 3:
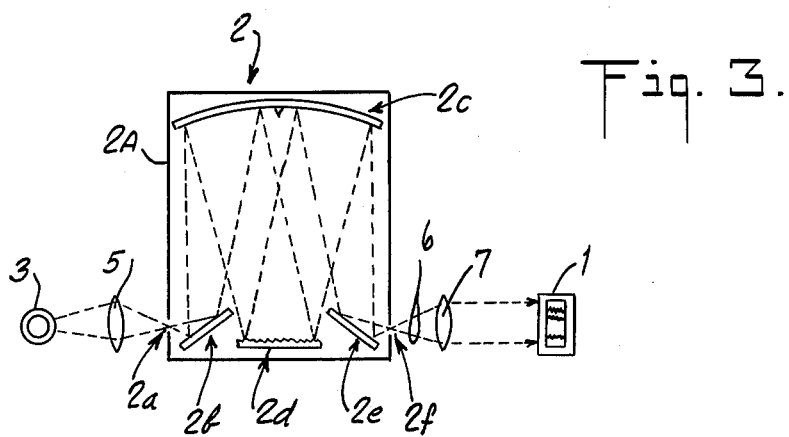
FIG. 3 is a side view of a schematic diagram of the excitation portion of a fluorometer in accordance with the present invention and illustrating the optical path through the excitation polychromator.

More particularly with regard to the fluorometer structure, the excitation polychromator 2 may be constructed especially for this application using well known optical principles and components or may be obtained by modifying a conventional monochromator. In the latter case, as shown in FIG. 3, the monochromator 2A may be mounted on its side so that the entrance slit 2a is horizontal, that is, transverse to the long axis of the cuvette, and the exit slit is removed. FIG. 3 shows the light path through the exciting polychromator based on a commercially-available Ebert-type monochromator (e.g., Jarrell-Ash No. 82–410). The light from the arc lamp 3, focussed by lens system 5 passes through the entrance slit 2a, and is reflected by a mirror 2b onto the collimating mirror 2c, which produces parallel light for illuminating the grating 2d. The dispersed parallel light reflected from the grating 2d is refocussed by collimating mirror 2c and directed to the exit slit plane 2f by the mirror 2e. The diverging spectrum of exciting radiation 6 emanating from the exit aperture is then imaged by lens system 7 onto the elongated sample cuvette 1.

It will be appreciated as indicated above that a multicomponent sample will show a spatial variation in its fluorescence emissions in accordance with the spacing of the respective excitation energies in radiation 6. Accordingly, a series or set of spatially varying fluorescence emissions 60 will result, in the manner shown in FIG. 2b. The set at right angles to the direction of the exciting radiation spectrum is particularly preferred for analysis to avoid confusion with the exciting radiation.

The resulting set of fluorescence emissions 60 may be focussed by a suitable lens system 8 onto the entrance slit 4a of the analyzing polychromator 4 for analysis. As with the exciting polychromator, the analyzing polychromator may be constructed especially for this application using well known optical principles and components, or may be obtained by modifying a conventional monochromator. In the latter case, as shown in FIG. 4, the monochromator 4A (again a commercially available Ebert-type monochromator) is mounted in the upright position so that the long axis of the entrance slit 4a is parallel to the long axis of the sample cuvette 1. The fluorescent image of the cuvette passes through the entrance slit 4a, and is directed by mirror 4b onto collimating mirror 4c, which produces parallel light to illuminate the grating 4d. The dispersed parallel light reflected from the grating 4d is refocussed by collimating mirror 4c, and directed to the exit slit plane 4f by the mirror 4e. At the exit slit plane 4f a dispersed image of the cuvette 1 will be produced. The dispersion of the image results from the fact that the polychromator 4 produces a series of fluorescence spectra dispersed along an axis parallel to the short axis of the slit for every emitting region along the long axis of the slit. Moreover, because of the geometry of the polychromatic exciting light 6, excitation and emission spectra are obtained simultaneously. The dispersed image will be of the form shown in FIG. 2c. (It should be noed that a conventional monochromator will invert the cuvette image, but the image of FIG. 2c is not inverted for clarity.) In order to display and process the dispersed cuvette image, a suitable detecting means 9, such as a video recorder or camera 9A, may be placed at the exit slit plane.

Camera 9A may be a conventional video recording device, but as ordinary television cameras may lack the requisite sensitivity, it is preferred that an image intensified detector be used for recording, such as the RCA 4849 ISIT-type tube. Also preferred are solid-state imagers, such as a charge coupled device (CCD), charge injection device (CID) or a photodiode array, operated with an image intensifier. With such transducers, operation at the photoelectron noise limit is possible; the image intensifier may be gated on for periods as short as a few nanoseconds for time resolved spectroscopy; and if the sensor is cooled, integration of signals for periods of hours is possible.

Figure 5:
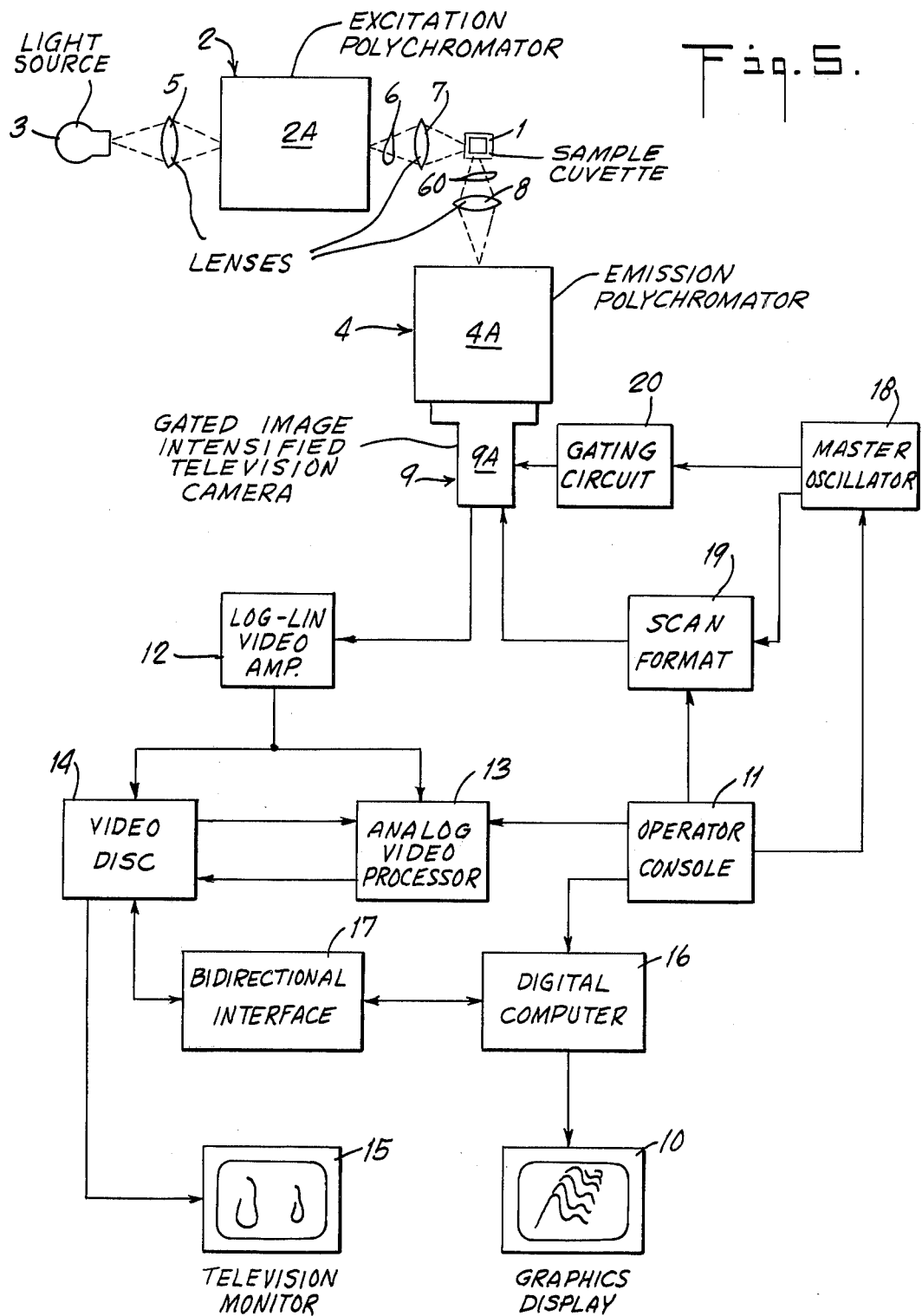
FIG. 5 is a block diagram of a fluorometer system including both optical and electronic components.

A suitable data acquisition system in combination with the present fluorometer is illustrated in FIG. 5. It includes both digital and analog video processing techniques. The optical components are numbered as in FIGS. 3 and 4. The rows and columns of the fluorescence intensity matrix produced by the fluorometer correspond to the excitation and emission spectra of the sample in such a manner that each row represents an emission spectrum taken at a particular exciting wavelength, while each column represents an excitation spectrum taken at a particular wavelength of emission as in FIG. 2c. Using a system such as indicated in FIG. 5 a dedicated video processor may be used to produce a pseudo three-dimensional presentation of the image acquired by the video camera 9A on a graphics display 10, where the X-Y coordinates are displayed in isometric projection and intensity information is displayed as a vertical deflection such as in FIG. 2d.

Figure 6:
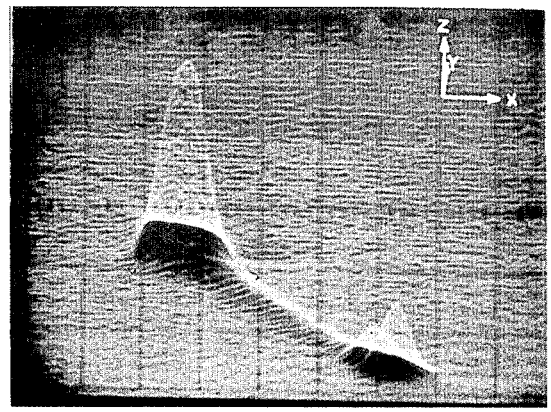
FIG. 6 is a three-dimensional display of the radiation from a medium pressure mercury arc in the spectral region 380–480 nm. The axis system orientation is illustrated in the upper right hand corner. The X axis is the emission wavelength; the Y axis is the excitation wavelength; and the Z axis is the emitted intensity.
Figure 7:
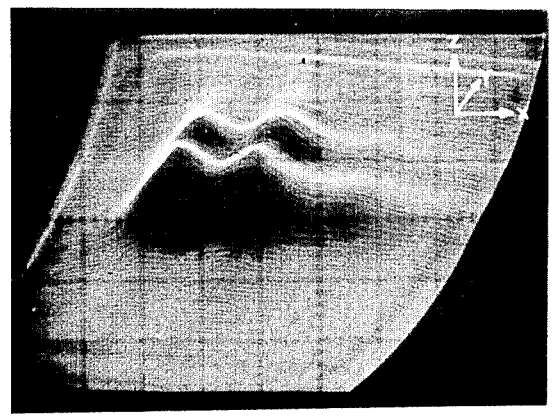
FIG. 7 shows a three-dimensional display of the fluorescence of $10^{-5}$ M perylene in ethanol obtained with the present invention.
Figure 9:
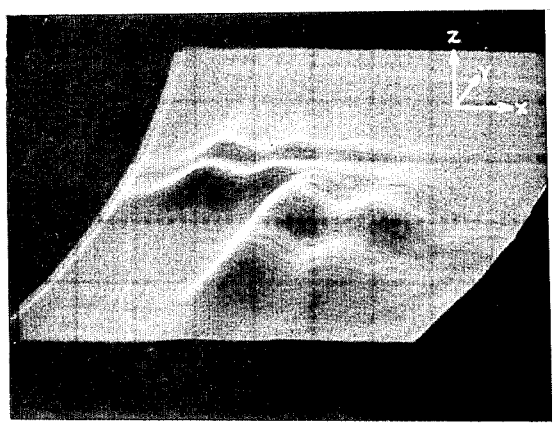
FIG. 9 is a three-dimensional display of the fluorescence intensity of a mixture of $2 \times 10^{-6}$ M perylene and $2 \times 10^{-5}$ M anthracene in ethanol.

Typical presentations of this type are shown in greater detail in the photos in FIGS. 6, 7 and 9. Controls may be included in an operator console 11 which will allow the three-dimensional image to be rotated ±180° and to be tilted up to 90° to permit viewing from any angle. From the operator console 11 it is possible to direct, through a master oscillator 18, the timing and sequencing of data acquisition; the scan format 19; and the shuttering of the camera by gating circuit 20. For intermediate storage and initial data evaluation and comparison the output of the video camera 9A may be loaded, through a log-linear video amplifier 12 and analog video processor 13, onto a video disc 14. Such an analog data acquisition system will allow storage of 400 images at the full television resolution and can operate at the usual television scan rate. Using a "head per track" system any two images may be played back and exhibited in either a flicker or difference mode on a television monitor 15. The video disc 14 may serve as an analog buffer memory which can communicate with a digital computer 16 in a bidirectional manner through interface 17 at a rate compatible with the computer's memory cycle time. Such a hybrid video-digital system is of extreme advantage in that with an analog processor and analog memory, an initial evaluation of the data can be rapidly made saving large amounts of computer time, and with access to a large digital computer, virtually any computational algorithm can be applied to the data.

In some cases where the full spatial resolution of the video system is not required, or only a few spectral points are accessed, it may prove advantageous to load the data directly into the core memory of a minicomputer, through the direct memory access (DMA) port.

Examples of data displays obtainable with a fluorometer in accordance with the present invention, which illustrate the capabilities of the instrument, are shown in FIGS. 6 to 10. The photos in FIGS. 6 to 10 were obtained using a polychromatic excitation beam produced by focussing a suitable 150 watt arc lamp on the entrance slit of a Bausch & Lomb High Intensity 33-84-24 monochromator mounted on its side and modified as previously indicated by removal of its exit slit. A Bausch & Lomb 33-86-45 analyzing monochromator was used, mounted in the usual upright position and with its exit slit also removed. The resulting spectral image from the analyzing monochromator was detected by the photosensitive surface of a Singer GPL-3 low-light-level television camera. This camera consisted of a two-stage image intensifier fiber optically coupled to a conventional vidicon. (Further tests using a COHU-2820-011 camera based on a SIT-type vidicon (RCA 4804) gave comparable results.) The scanning of the target by the electron beam was accomplished in the usual manner. Starting in the upper left hand corner of the target the beam was rapidly swept in the horizontal direction and at the end of the horizontal sweep the beam was blanked and returned to the left side. Synchronously, the beam was also swept downward along the vertical axis at a rate 262.5 times slower than the horizontal sweep. Because of the geometry of the exciting beam and the fact that the video signal is proportional to the total number of photons which have fallen on a particular resolution element during the time between scans, each horizontal video line yields a fluorescence image spectrum at a particular wavelength of excitation.

To produce the real-time displays shown in the photos in FIGS. 6, 7, 9 and 10 the video signal was applied to the Y-axis of a Tektronix 545 oscilloscope and the horizontal sweep ramp was applied to the X-axis. A three-dimensional effect in FIGS. 6, 7 and 9 was achieved by mixing the vertical sweep ramp with both the video signal and the horizontal sweep ramp so that each fluorescence emission spectrum was offset vertically and horizontally from the next. By further mixing of vertical and horizontal ramps displays can be tilted and rotated for convenient viewing from all angles. This type of pseudo three-dimensional display has been found to be significantly more interpretable than a conventional two-dimensional television image such as shown in FIG. 8.

Firstly, in evaluating the capabilities of the instrument a test may be made to determine spectral resolution. In this regard FIG. 6 is a photo of a three-dimensional display of the intensity of a medium pressure mercury arc lamp as a function of excitation and alalyzing wavelengths obtained with the equipment set forth above. In the axis system indicated in the upper right hand corner of the figure, the X represents the emission wavelength, the Y represents the excitation wavelength, and the Z represents the fluorescence intensity. To obtain this data, the output of the exciting polychromator was imaged directly onto the entrance slit of the analyzing polychromator. With such an arrangement, it might be expected that all of the light intensity will be confined to a straight line in the image plane with a slope proportional to the ratio of the dispersions of the two polychromators, since each wavelength of light is dispersed a proportionate amount along both axes independent of the wavelength of the light. It will be seen from FIG. 6, which shows the 400–440 nm region of the spectrum, that this expectation is confirmed rather nicely and that the resolution achievable is better than 2 nm. More particularly, in the photo of FIG. 6 the 436, 407 and 404 nm mercury lines are readily apparent. Clearly since the 407 and 404 nm lines are resolvable, the resolution achievable is at least 50% of the difference between them or 1.5 nm. Further, a bright line is seen to extend between the bases of the respective lines, which is the continuum of radiation from the mercury arc. Scattered exciting light is also expected to produce a similar pattern and is shown in the upper left hand corner of FIG. 2c.

Next, FIG. 7 shows a three-dimensional display of the fluorescence of the aromatic hydrocarbon perylene (concentration, $10^{-5}$ M in ethanol). It is immediately apparent from the similarity of all the horizontal scan lines that the relative fluorescence emission spectrum is independent of the exciting wavelength, and conversely, the excitation spectrum is independent of the emission wavelength. Also apparent is the mirror symmetry of emission and excitation spectra. The axis orientation is again shown in the upper right hand corner, and the axes have the same meaning as in FIG. 6. The emission wavelength axis extends from 405 nm on the left to 540 nm on the right side. The emission peaks occur at 440, 469, and 500 nm in agreement with published spectra such as found in "Handbook of Fluorescence Spectra of Aromatic Molecules", I. B. Berlman, Academic Press, New York, 1965. The excitation wavelength axis extends from 480 nm at its lowest point to 342 nm at its highest point. The excitation peaks occur at 432, 405, and 386 nm. It will be appreciated that the instrument provides spectra which can be readily compared with published spectra to identify the components of the sample being analyzed. Thus, uniquely defined spectra may be obtained which will indicate the presence of unique compounds using least squares fitting with known spectra.

Figure 8:
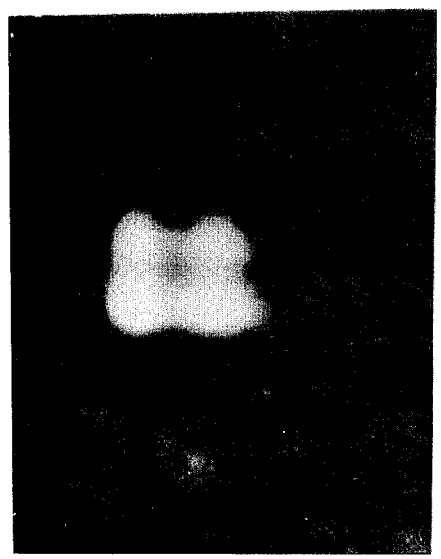
FIG. 8 shows a conventional television display of the fluorescence of perylene under conditions similar to those used to obtain FIG. 7.

For comparison to the pseudo-three-dimensional image of FIG. 7, FIG. 8 shows a television camera's output displayed on a television monitor as a conventional 2-dimensional image. To obtain this image the output of the camera was connected to a monitor and the resultant display photographed. This two-dimensional TV image is similar to a topographical map in that all regions in the spectral plane are visible with the intensities indicated by the relative brightnesses of the image elements. However, such a display, while electronically analyzable, does not offer readily quantitable information to the eye of an observer. Thus, the pseudo-three-dimensional display, although containing hidden lines, gives a better umderstanding of the quantitative values of the spectral intensities for the purpose of visual analysis.

FIG. 9 is a pseudo-three-dimensional display of a mixture of perylene and anthracene. Here, the perylene spectra are recognizable from FIG. 7 and are localized in the lower right hand corner of the fluorescence plane. The anthracene spectra lie in the upper left hand region. Such behavior is, of course, expected since anthracene's emission and absorption spectra lie to the blue of those of perylene (see Berlman, "Handbook of Fluorescence Spectra of Aromatic Molecules", supra). The orientation of the axis system is shown in the upper right hand corner. The emission axis extends from 375 nm on the left to 525 nm on the right hand side. The excitation axis extends from 466 nm at the bottom to 325 nm at the top. The short wavelength emission peak of anthracene at 380 nm is severely attenuated due to the optical coating of the lens of the television camera.

Figure 10:
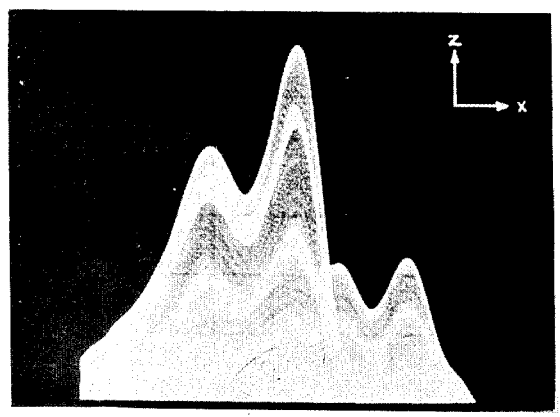
FIG. 10, for comparison, is a two-dimensional display of the fluorescence intensity of the sample of FIG. 9 as a function of fluorescence wavelength.

FIG. 10 illustrates how confusing a two-dimensional display of the spectra of the sample used to produce FIG. 9 can be to the eye of an observer. In FIG. 10 all of the fluorescence emission spectra for all the excitation wavelengths have been superimposed on each other, and the intensity axis gain has been increased. The fluorescence excitation wavelengths extend from 512 nm on the left to 379 nm on the right. The two high intensity peaks on the left arise from perylene, and the two on the right from anthracene. This display is similar to that produced by a conventional fluorometer except that the present display including 241 spectra was produced in 16.7 msec. Further, it will be seen that using a display such as in FIG. 9 the spectra of the components in a multicomponent sample can be separated into spectral regions for ready recognition.

Finally, the linearity of the fluorescence intensity as a function of concentration may be investigated. A plot of the logarithm of fluorescence intensity of perylene at 440 nm versus the logarithm of concentration yields a straight line with slope equal to unity within experimental error ($\sim$10%). Linearity may be obtained for four decades of concentration, and 2 parts per billion perylene could be measured with a signal-to-noise ratio of 2. In this regard, it has been shown (J. A. Westphal in "Astronomical Observations with Television-Type Sensors", pg. 127; J. W. Glaspy and G. A. H. Walker, eds. Institute of Astronomy and Space Sciences, Vancouver (1973)) that SIT-type television cameras can be cooled to $-80°$ C and the signal integrated for a period of up to 5 hours. During this period the signal-to-noise ratio increases with the square root of the integration time. Under these conditions, with the present system, it could reasonably be expected that a 170 sec. integration time would allow detection of 0.02 parts per billion perylene.

As previously indicted, the fluorometer of the present invention is particularly well suited for the analysis of multicomponent mixtures. It will accordingly be explained how the data obtained may be used to provide information about (a) the number of components contributing to the spectra; (b) the composition of the sample if the spectra of standard solutions is known; or (c) the relative excitation and emission spectrum of each specie in the sample.

In order to proceed, it must first be understood how the fluorescence intensity depends upon the wavelengths of excitation and emission. For most large organic molecules in solution, the fluorescence emission occurs only from the fully vibrationally relaxed first excited singlet electronic state. This fact accounts for the generally observed lack of dependence of the emission spectrum and emission quantum yield $\Phi_f$ on the wavelength of excitation $\lambda_{ex}$, and the lack of dependence of the excitation spectrum on the wavelength where the fluorescence is monitored, $\lambda_{em}$. Thus for a single component, the fluorescence intensity $I_f(\lambda_{ex}, \lambda_{em})$ may be expressed as follows:

$$I_f(\lambda_{ex}, \lambda_{em}) = (1 - 10^{-\epsilon(\lambda_{ex})lC}) \Phi_f I_o(\lambda_{ex}) \beta(\lambda_{em}) \gamma(\lambda_{em}) \quad (1)$$

where $I_o(\lambda_{ex})$ is the intensity of the monochromatic light beam used to excite the sample, $\epsilon(\lambda_{ex})$ is the molar extinction coefficient of the sample, $l$ is the path length of the sample, $C$ is the concentration of the fluorescent specie, $\beta(\lambda_{em})$ is the fraction of fluorescence photons emitted at $\lambda_{em}$, and $\gamma(\lambda_{em})$ expresses the wavelength dependence of the sensitivity of the analyzing monochromator and photon detector. In the case of low optical densities Equation 1 has the simpler form:

$$I(\lambda_{ex}, \lambda_{em}) = \alpha \, x(\lambda_{em}) \, y(\lambda_{ex}) \quad (2)$$

where $\alpha = 2.303 \, lC\Phi_f$ is a concentration dependent constant, $x(\lambda_{em}) = \beta(\lambda_{em})\gamma(\lambda_{em})$ is the observed fluorescence spectrum, and $y(\lambda_{ex}) = \epsilon(\lambda_{ex})I_o(\lambda_{ex})$ is the observed excitation spectrum.

The present apparatus yields a matrix $\underline{M}$ of data points, whose matrix elements $M_{ij}$ consist of measurements of the fluorescence intensity at discrete values of $\lambda_{em}$ (indexed by the subscript $i$), and discrete values of $\lambda_{ex}$ (indexed by the subscript $j$). Equation (2) suggests that for a single component, $\underline{M}$ may be represented as follows:

$$\underline{M} = \alpha \, \underline{x} \, \underline{y} \text{ where } M_{ij} \equiv \alpha x_i y_j \quad (3)$$

i.e., $\underline{M}$ may be conveniently thought of as the outer product of the sequenced fluorescence column vector $\underline{x} = \{X_i\}$ and the sequenced excitation row vector $\underline{y} = \{y_j\}$. Then, for a sample containing $r$ different species, $$\underline{M} = \sum_{k=1}^{r} \alpha^k x^k y^k \quad (4)$$

where the superscript $k$ is used to enumerate the components of the mixture. Equation (4) is valid if the total optical density of the sample is low, and no energy transfer takes place between species. The analysis of the data then consists of finding $r$, $\alpha^k$, $\underline{x}^k$ and $\underline{y}^k$ for the observed $\underline{M}$.

In many situations of the spectra of standard solutions for every component of the sample are known and only the composition of the sample is desired, i.e., only the values of $\alpha$ are being sought. In this case it can easily be shown that the following set of linear equations:

$$\sum_l \left[ \sum_{i,j} (N_{ij})^k (N_{ij})^l \right] \alpha_l = \sum_{ij} (N_{ij})^k M_{ij} \quad (5)$$

gives the least squares best values of $\alpha_l$, where $$N_{ij}{}^k \equiv x_i{}^k y_j{}^k. \quad (6)$$

In some circumstances there may be no prior information about the sample. However, it is still possible to obtain information about the number of emitting components in the sample and their relative spectra by finding the dimension of the vector spaces which span $\underline{M}$, and by finding a set of "basis" vectors which best describe $\underline{M}$, and simultaneously obey certain physical constraints peculiar to fluorescence. This methodology has been long appreciated as a useful tool in the factorization of bilinear forms.

As has been shown (see Nature 190, 27 (1961), Weber), the rank of $\underline{M}$ is a lower bound to the number of molecular species. If the dimensions of $\underline{x}$ and $\underline{y}$ are large compared to $r$, then it is reasonable to assume, since the matrix is overdetermined, that the set of $\underline{x}^k$ and $\underline{y}^k$ are linearly independent. In that case, the number of molecular species is given accurately by the rank of the matrix M. Several procedures exist for finding the rank of a matrix, such as found in the text "Mathematical Methods for Digital Computations" by Ralston and Wilf at page 46. For a number of reasons, the preferred procedure is to find the number of "nonzero" eigenvalues of the real square symmetric matrices $\underline{M}\underline{M}^T$ or $\underline{M}^T\underline{M}$, both of which have the same rank as $\underline{M}$. The superscript T indicates the transpose operation.

In this procedure, the practical problem arises that due to experimental uncertainties and round off errors in the computational process, none of the eingenvalues of $\underline{M}\underline{M}^T$ will really be zero. However, the square roots of the eigenvalues of $\underline{M}\underline{M}^T$ provide a direct indication of the error produced by assuming they are zero. Hence if any of these numbers are of the same size as the errors in the data, they must be treated as zero. Correspondingly, any molecule for which $\alpha \, \underline{x} \, \underline{y}$ is below the noise level will not be detected.

If a determination of the rank of the fluorescence matrix indicates that the number of components is small, it is possible to obtain information about the spectra of an individual component. First, one finds sets of normalized eigenvectors of $\underline{M}^T\underline{M}$ and $\underline{M}\underline{M}^T$ from the following equations:

$$\underline{M}^T\underline{M}\underline{v}_i = \xi_i \, \underline{v}_i \quad (7)$$
$$\underline{M}\underline{M}^T\underline{w}_i = \xi_i \, \underline{w}_i \quad (8)$$
$$\underline{w}_i = \underline{w}_i \, \sqrt{\xi_i} = M\underline{v}_i \quad (9)$$

where $\underline{v}_i$ and $\underline{w}_i$ are eigenvectors and $\xi_i$ is the ith eigenvalue associated with each. From the theory of unsymmetric bilinear forms it is known that if the eigenvalues of $\underline{M}^T\underline{M}$ are arranged in the order $\xi_1 \geq \xi_2 \geq \ldots$ then $\underline{M}$ is, in the least squares sense, best represented by $$M = \sum_{i=1}^{r} u_i v_i^T \equiv UV^T \tag{10}$$

where the columns $u$ and $v$ have been arranged into matrices $U = (u_1, u_2, \ldots)$ and $V = (v_1, v_2, \ldots)$.

These matrices $U$ and $V$ do not quite solve the problem of reducing $M$ to the form $$M_{ij} = \sum_{k=1}^{} \alpha^k \{x_i^k\} \{y_j^k\} \tag{11}$$

where the $\{x_i^k\}$ and $\{y_i^k\}$ are the excitation and emission vectors. The true $x$ and $y$ must consist entirely of positive numbers while the constructions given above for $U$ and $V$ will generally lead to some negative entries. To proceed further it should be noted that if $$M = UV^T$$

then also $$M = U'V'^T \tag{12}$$

where
$U' = UK$ and
$V' = V(K^T)^{-1}$ where $K$ is a matrix which yields $U \geq 0$ and $V' \geq 0$. Thus a matrix $K$ must be found so that $U' \geq 0$ and $V' \geq 0$. Now for rank two, equation (12) yields:

$$u'_1 = u_1 k_{11} + u_2 k_{21} \geq 0 \tag{13}$$
$$u'_2 = u_2 k_{22} + u_1 k_{12} \geq 0 \tag{14}$$
$$v'_1 = (v_1 k_{22} - v_2 k_{12})/(k_{11}k_{22} - k_{12}k_{21}) \geq 0 \tag{15}$$
$$v'_2 = (v_2 k_{11} - v_1 k_{21})/(k_{11}k_{22} - k_{12}k_{21}) \geq 0 \tag{16}$$

Clearly it can be assumed $k_{11} = k_{22} = 1$ without loss of generality. Then because $u_1 \geq 0$ and $v_1 \geq 0$ and $u_2$ and $v_2$ have some positive elements, $$k_{12} \geq \max_p (-u_{p_1}/u_{p_2}) \geq 0 \tag{17}$$

$$u_{p_2} \min < 0 \; (-u_{p_1}/u_{p_2}) \geq k_{21} \geq u_{p_2} \max > 0 \; (-u_{p_1}/u_{p_2}) \tag{18}$$

$$\text{If } |K| \geq 0, k_{21} \leq \min_p (v_{p_2}/v_{p_1}) \leq 0 \tag{19}$$

$$v_{p_2} \min > 0 \; (v_{p_1}/v_{p_2}) \geq k_{12} \geq v_{p_2} \max < 0 \; (v_{p_1}/v_{p_2}) \tag{20}$$

and $|K| = 1 - k_{12}k_{21} > 0$ as assumed.

There are no solutions to (13–16) for $|K| < 0$. Hence the above equations (17–20) define the permissible range of $k_{12}$ and $k_{21}$. Clearly, as the range of spectral frequencies scanned becomes larger, the permissible range imposed by equations (17–20) for $x$ and $y$ becomes narrower and the spectra accordingly becomes more particularly defined.

Figure 11:
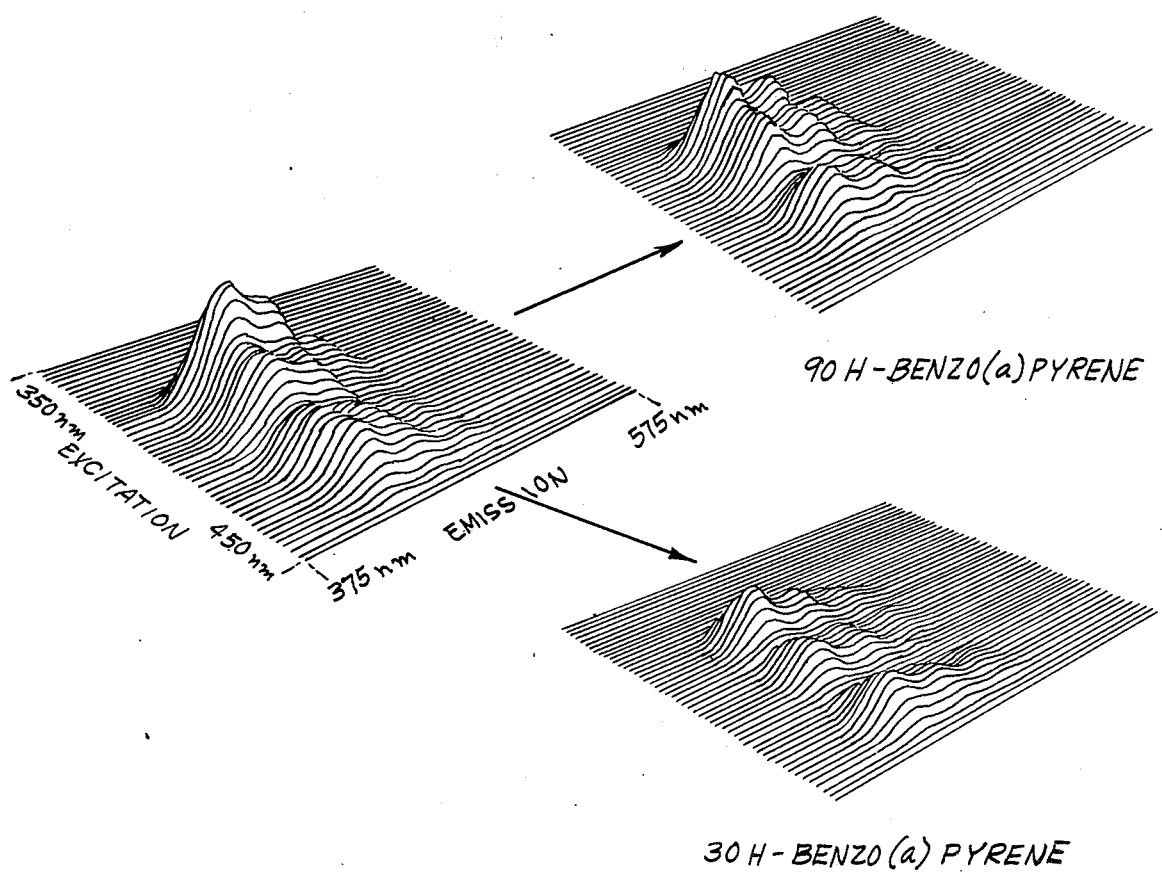
FIG. 11 illustrates a computer simulated decomposition of a fluorescent mixture into its components using alqorithms in accordance with the present invention.

These matrices can be used in suitable algorithms to analyze the spectra of multicomponent samples. For example, FIG. 11 illustrates a computer simulated decomposition of a fluorescent mixture into its components using algorithms in accordance with the present invention. The left hand drawing of FIG. 11 is a computer simulation of a mixture of the fluorescence spectra of the fluorescent compounds 9-OH and 3-OH Benzo(a)pyrene. The spectra were simulated by approximating the major peaks with gaussian curves of appropriate half-widths. The drawings are isometric projections of the fluorescence matrix, with the $x$ axis representing the emission wavelengths from 375 to 575 nm, the $y$ axis representing the excitation wavelengths from 450 to 350 nm and the $z$ axis representing the intensity. For clarity the hidden lines in the drawing have been removed. A determination of the eigenvalues of the fluorescence matrix multiplied by its transpose showed that only two were significantly greater than zero, thus indicating that only two components were present. Next the eigenvectors were found according to Eqns 7–9; these were then linearly transformed to ranges of possible spectra, according to Eqns 17–20. The upper righthand drawing of FIG. 11 shows the fluorescence matrix of the component associated with the largest eigenvalue; it is identical with 9-OH Benzo(a)pyrene. The lower righthand drawing shows the fluorescence matrix of the component, associated with the second eigenvalue; it is identical to 3-OH Benzo(a)pyrene. These data illustrate how a mixture of two fluorescent species with quite similar spectra can be readily separated from each other using the methods of the present invention.

It will accordingly be seen that a fluorometer is provided which instantaneously presents and analyzes both the excitation and emission spectra of a multi-component fluorescence sample with a resolution of better than 2 nm.

We claim:

1. Apparatus for fluorescence spectroscopy comprising:
   a. means for holding a sample of fluorescent material;
   b. means for simultaneously directing a spatially distributed spectrum of exciting energies onto said sample distributed along its length; and
   c. means for simultaneously analyzing the set of fluorescence emissions given off by said sample along its length by producing a fluorescence intensity matrix of the excitation and emission spectra.

2. Apparatus as in claim 1 further comprising means for sensing said fluorescence intensity matrix and means for analyzing said sensed matrix to determine the components of the sample.

3. Apparatus as in claim 2 wherein said sensing means comprises a video detector.

4. Apparatus as in claim 1 wherein said means for directing said spectrum of exciting energies comprises an excitation monochromator having an entrance slit whose short axis is parallel to the long axis of said sample holding means and whose exit slit is removed.

5. Apparatus as in claim 1 wherein said means for analyzing the set of fluorescence emissions comprises an analyzing monochromator having a wide aperture exit.

6. A fluorometer comprising:
   a. first polychromator means for producing a spatially distributed spectrum of exciting energies;
   b. a sample cuvette means for holding a sample of fluorescent material and having a long axis disposed such that said spatially distributed exciting energies from said first polychromator means excite said sample along its length; and
   c. second polychromator means, disposed adjacent to said sample cuvette means to receive the emitted energies given off by the excited sample along its length, for simultaneously analyzing the excitation and emission spectra of said sample by producing a fluorescence intensity matrix of the excitation and emission spectra.

7. A fluorometer as in claim 6 wherein said second polychromator means comprises:

d. entrance slit means for passing the energies emitted by said sample upon excitation along its length and disposed adjacent said cuvette means with its long axis parallel to the long axis of said cuvette means;

e. optical means for analyzing said energies emitted by said sample after passage by said slit means by producing a fluorescence intensity matrix of the excitation and emission spectra of said sample; and f. exit aperture means for passing said fluorescence intensity matrix.

8. A fluorometer as in claim 7 wherein said first polychromator means comprises:

d. means for producing exciting energy;

e. entrance slit means for passing said exciting energy and having its short axis disposed parallel to the long axis of said cuvette means;

f. optical means for spatially distributing said exciting energy after passage by said slit means into a spectrum of wavelengths along an axis; and g. means for directing said spatially distributed spectrum of wavelengths onto said cuvette means distributed along its long axis.

9. A fluorometer as in claim 8 wherein the plane, containing said axis along which said wavelengths are spatially distributed and said long axis of said cuvette means, is disposed at an angle of less than 180° with respect to the plane containing said long axis of said cuvette means and said long axis of said entrance slit means of said second polychromator means.

10. A fluorometer as in claim 6 further comprising means for converting said fluorescence intensity matrix into a computer graphics display.

11. A method of analyzing fluorescence spectra comprising the steps of:

a. obtaining a sample of fluorescent material to be analyzed;

b. directing a spatially distributed spectrum of exciting energies onto said sample distributed along an axis to excite said sample; and c. simultaneously analyzing the set of fluorescence emissions given off by said sample upon excitation along said axis by producing a fluorescence intensity matrix of the excitation and emission spectra.

12. A method as in claim 11 comprising the further step of analyzing said fluorescence intensity matrix to determine the components of the sample.

13. A method as in claim 11 comprising the further step of sensing said fluorescence intensity matrix with a video detector.

14. A method as in claim 11 comprising the further steps of converting said fluorescence intensity matrix into an analogous electronic matrix and analyzing said electronic matrix.

15. A method as in claim 14 wherein said analyzing step comprises presenting said electronic matrix on a computer graphics display.

16. A fluorescence spectrometer comprising:

a. means having an axis for holding a sample of fluorescent material;

b. means for directing exciting energy onto said sample distributed along the axis of said holding means; and c. means for simultaneously analyzing the set of fluorescence emissions given off by said sample along said axis over a predetermined range of emission wavelengths by producing a fluorescence intensity matrix of the excitation and emission spectra.

17. A fluorescence spectrometer as in claim 16 further comprising:

d. means for determining the eigenvalues and eigenvectors associated with said fluorescence intensity matrix; and e. means for linearly transforming the eigenvectors so that the transformed vectors obey constraints consistent with the physics of fluorescence.

18. A method of fluorescence analysis comprising the steps of:

a. providing a sample of fluorescent material to be analyzed;

b. directing exciting energy onto said sample distributed along an axis; and c. analyzing the emitted energies given off by the excited sample by simultaneously producing the excitation and emission spectra thereof in the form of a fluorescence intensity matrix.

19. A method as in claim 18 further comprising the steps of:

d. determining the eigenvalues and eigenvectors associated with said fluorescence matrix; and e. linearly transforming the eigenvectors so that the transformed vectors obey constraints consistent with the physics of fluorescence.

* * * * *

UNITED STATES PATENT AND TRADEMARK OFFICE
CERTIFICATE OF CORRECTION

PATENT NO. : 4,031,398
DATED : June 21, 1977
INVENTOR(S) : JAMES B. CALLIS and ERNEST R. DAVIDSON It is certified that error appears in the above-identified patent and that said Letters Patent are hereby corrected as shown below:

Col. 5, line 31, "noed" should read --noted--;

Col. 7, line 20, "alalyzing" should read --analyzing--;

Col. 8, line 19, "umderstanding" should read --understanding--;

Col. 9, line 59, "$\{X_i\}$" should read --$\{x_i\}$--;

in equation (4), "$x^k y^k$" should read --$\underline{x}^k \underline{y}^k$--

Col. 10, line 36, "M" should read --$\underset{\sim}{M}$--;

Col. 11, in equation (10), "$UV^T$" should read --$\underline{U}\underline{V}^T$-- line 26 "$\underline{U}$" should read --$\underline{U}'$-- line 36, "$v_2$" should read --$\underline{v}_2$--

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*